United States Patent [19]

Hengesbach

[11] Patent Number: 4,523,882

[45] Date of Patent: Jun. 18, 1985

[54] DRILL PRESS WITH OVERHEAD MOUNT

[76] Inventor: Robert W. Hengesbach, 7886 Mentor Rd., Mentor, Ohio 44060

[21] Appl. No.: 374,950

[22] Filed: May 5, 1982

[51] Int. Cl.[3] .................................... B23B 47/00

[52] U.S. Cl. .................................... 408/236; 248/653; 408/99; 408/111; 408/234

[58] Field of Search ................. 408/72, 100, 234, 236, 408/237, 238, 7.2, 99, 110, 111; 248/333, 324, 653, 666, 667

[56] References Cited

U.S. PATENT DOCUMENTS

| | | | |
|---|---|---|---|
| 382,472 | 5/1888 | Jennings | 408/236 X |
| 660,589 | 10/1900 | Read | 408/234 X |
| 857,020 | 6/1907 | Birch et al. | 408/99 |
| 2,318,595 | 5/1943 | Curtis | 248/653 X |
| 2,453,995 | 11/1948 | Lee | 408/234 |
| 2,462,979 | 3/1949 | Liebau | 408/100 |
| 2,761,440 | 9/1956 | Schwab | 408/111 |
| 2,764,893 | 10/1956 | Falkenberg | 74/25 |
| 2,786,677 | 3/1957 | Noonan et al. | 248/324 |
| 2,838,079 | 6/1958 | Abendroth | 408/234 X |
| 3,234,977 | 2/1966 | Byers | 408/236 |
| 3,387,509 | 6/1968 | Lupear | 408/76 |
| 3,417,949 | 12/1968 | Waber | 248/647 |
| 3,552,239 | 1/1971 | Yeaman et al. | 408/180 |
| 3,587,389 | 6/1971 | Kreimer | 409/212 |
| 3,874,810 | 4/1975 | Russell | 408/99 X |
| 4,300,863 | 11/1981 | Partain | 409/109 |

FOREIGN PATENT DOCUMENTS

| | | | |
|---|---|---|---|
| 2238838 | 2/1974 | Fed. Rep. of Germany | 408/56 X |
| 1017081 | 12/1952 | France | 408/236 |
| 207325 | 9/1966 | Sweden | 408/100 |

*Primary Examiner*—William R. Briggs
*Attorney, Agent, or Firm*—David A. Burge

[57] ABSTRACT

A drill press includes an overhead mount for supporting a power-operated drilling unit from an existing structure at locations above a work area, thereby enabling the accurate drilling of holes in large workpieces. An upright member is attached to one portion of the existing structure, such as a ceiling, and provides vertical support for a power-operated drilling unit. The upright member is extensible, enabling the drilling unit to be raised or lowered to accommodate workpieces of various sizes. Lateral support for the upright member is provided by brace members which connect the upright member to spaced portions of the existing structure.

8 Claims, 7 Drawing Figures

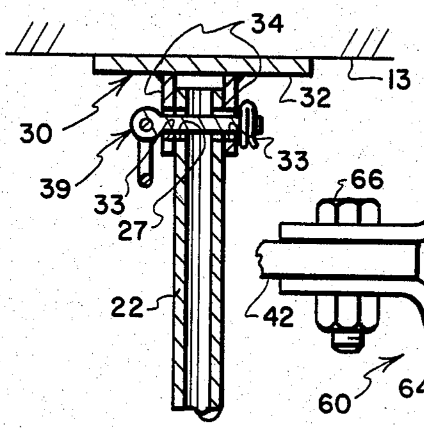
FIG. 2
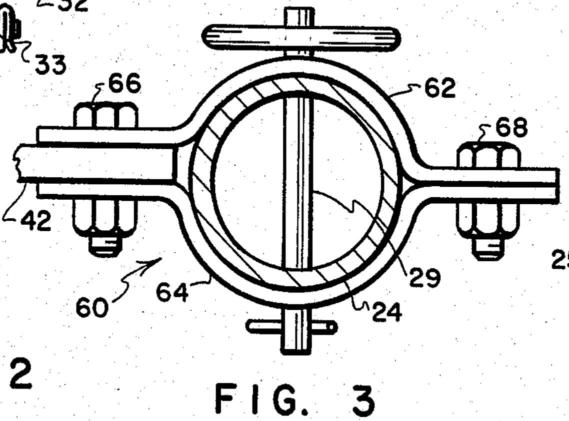
FIG. 3
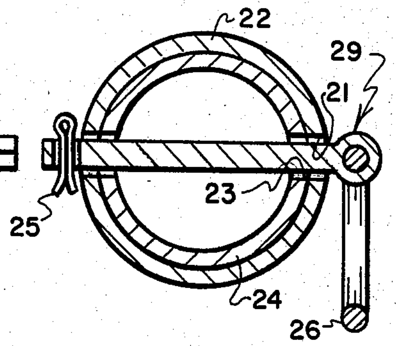
FIG. 4
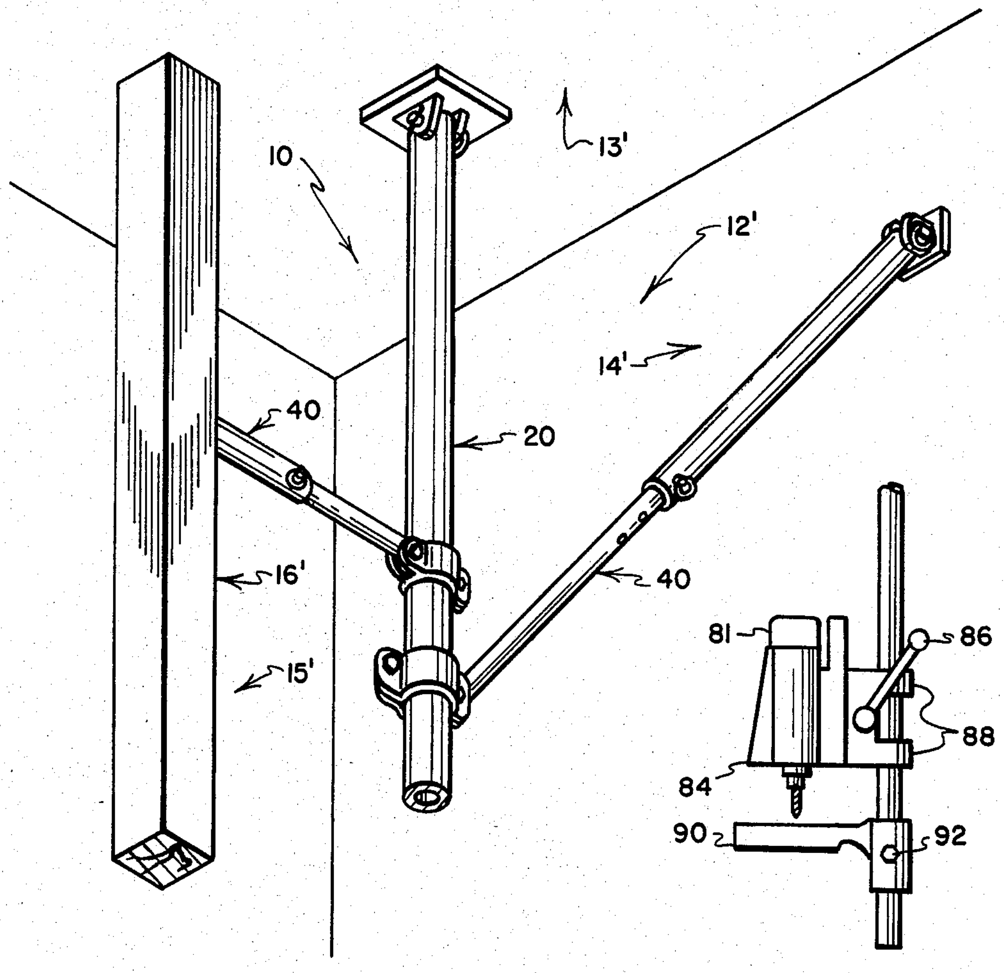
FIG. 5
FIG. 6

DRILL PRESS WITH OVERHEAD MOUNT

BACKGROUND OF THE INVENTION

1. Field of the Invention

The present invention relates to a drill press having an overhead mount for supporting a power-operated drilling unit, enabling holes to be drilled with precision at desired locations in a large workpiece positioned in a work area located beneath the drilling unit.

2. Prior Art

Despite the increasing demand for versatile power-driven tools of high quality, there are no appropriately inexpensive tools available which are well suited to accurately drill holes at substantially any desired location in a large workpiece such as a plywood sheet.

Portable electric drills lack the precision and accuracy necessary for close tolerance work, and often are not capable of developing the cutting power needed to drill through hard materials. Fixed stand drill presses impose still other restrictions on the type of work which can be undertaken. Drill presses of present day construction support a power-operated drilling unit above a work area which is defined by an underlying support table. The support table is located above a base, but beneath a drilling-unit chuck, and is intended to support a workpiece beneath a drill bit carried in the chuck. An upstanding column supports the table and the drilling unit (sometimes referred to as a drill head), and passes through the plane of the support table. The distance from the column to the axis of rotation of the chuck is defined as the throat distance of the press, and this throat distance limits the reach of the chuck from an edge of the workpiece to typically about 12 to 18 inches. The size of the workpieces with which previously proposed drill presses can be used is further limited by the lengths of their columns, i.e., the usable heights between their bases and drill bits carried in their chucks.

While large, specially configured, heavy duty drill presses are employed in industrial installations to permit the accurate drilling of holes as needed in products being fabricated, industrial drill presses are typically large and expensive, and are not appropriate for home use.

SUMMARY OF THE INVENTION

The present invention overcomes the foregoing and other drawbacks of prior proposals by providing a novel and improved, yet inexpensive and easy to use, drill press having an overhead mount which enables holes to be drilled with precision in large workpieces positioned in a work area located beneath the drill press.

A drill press embodying the preferred practice of the present invention utilizes an upright member which is adapted to be connected to spaced locations on an existing structure. The upright member provides support for a power-operated drilling unit carried near the lower end of the upright.

In preferred practice the upright is connected to three spaced portions of an existing structure. Vertical support is provided, at least in part, by an overhead bracket from which the upright depends. The upright is laterally supported by a pair of braces, each of which is connected near one end to the existing structure, and near its other end to the upright member.

An important feature of the present invention lies in the provision of an overhead mount which enables a power-operated drilling unit to be positioned above a work area without the need for support members which intersect the horizontal plane of the work area. By supporting the drilling unit entirely from above the work area, a throat-free drill press is provided. Such the throat limitations of prior drill presses have been eliminated, holes can be drilled at any desired location in a large workpiece, with the size of the workpiece being limited only by the size of the available workspace.

Another feature lies in the ability of the mount to support the drilling unit relatively high with respect to the floor extending beneath the work area, whereby a work area of substantial height can be utilized when needed. The upright is extensible, thereby enabling the drilling unit to be raised or lowered to accommodate workpieces of various sizes, and enabling drilling operations to be performed at heights which are convenient to the operator.

A further feature of the present invention lies in the versatility of the overhead mount. In its preferred embodiment, the overhead mount can be connected in any of several configurations to an existing structure. The brace members are capable of being extended or retracted to adjust their lengths, thus allowing them to be connected to spaced portions of an existing structure located at various distances from the upright. In preferred practice, the brace members are pivotally connected both to the existing structure and to the upright, thereby enabling the brace members and the upright to assume a wide variety of orientations relative to the existing structure. If, for example, it is desired to position the drill press near the center of a room, the brace members may be attached to spaced locations on the room's ceiling. Alternatively, if it is desired to position the drill press near the corner of a room, the brace members may be oriented substantially orthogonal, relative to each other and relative to the upright, with the upright secured to the ceiling and the braces attached to adjacent walls.

In preferred practice, the drilling unit takes the form of a portable electric drill releasably connected to a press mechanism such that the drill can be raised and lowered by an operating handle to effect drilling operations. Additionally, the overhead mount is preferably provided with a removable work table which can be secured to the upright member at a location beneath the drill chuck so that the drill press can be used with relatively small workpieces supported atop the table.

BRIEF DESCRIPTION OF THE DRAWINGS

The foregoing and other features, and a fuller understanding of the invention, may be had by referring to the following description and claims taken in conjunction with the accompanying drawings, wherein:

FIGS. 2, 3 and 4 are sectional views, as seen from the planes indicated by lines 2—2, 3—3 and 4—4 in FIG. 1;

FIG. 5 is a perspective view of a portion of the overhead mount shown connected to portions of an existing structure which extend in three intersecting planes; and, FIG. 6 is a side elevational view of a lower portion of the drill press with a removable work table attached to the upright of the press.

DESCRIPTION OF THE PREFERRED EMBODIMENT

Figure 1:
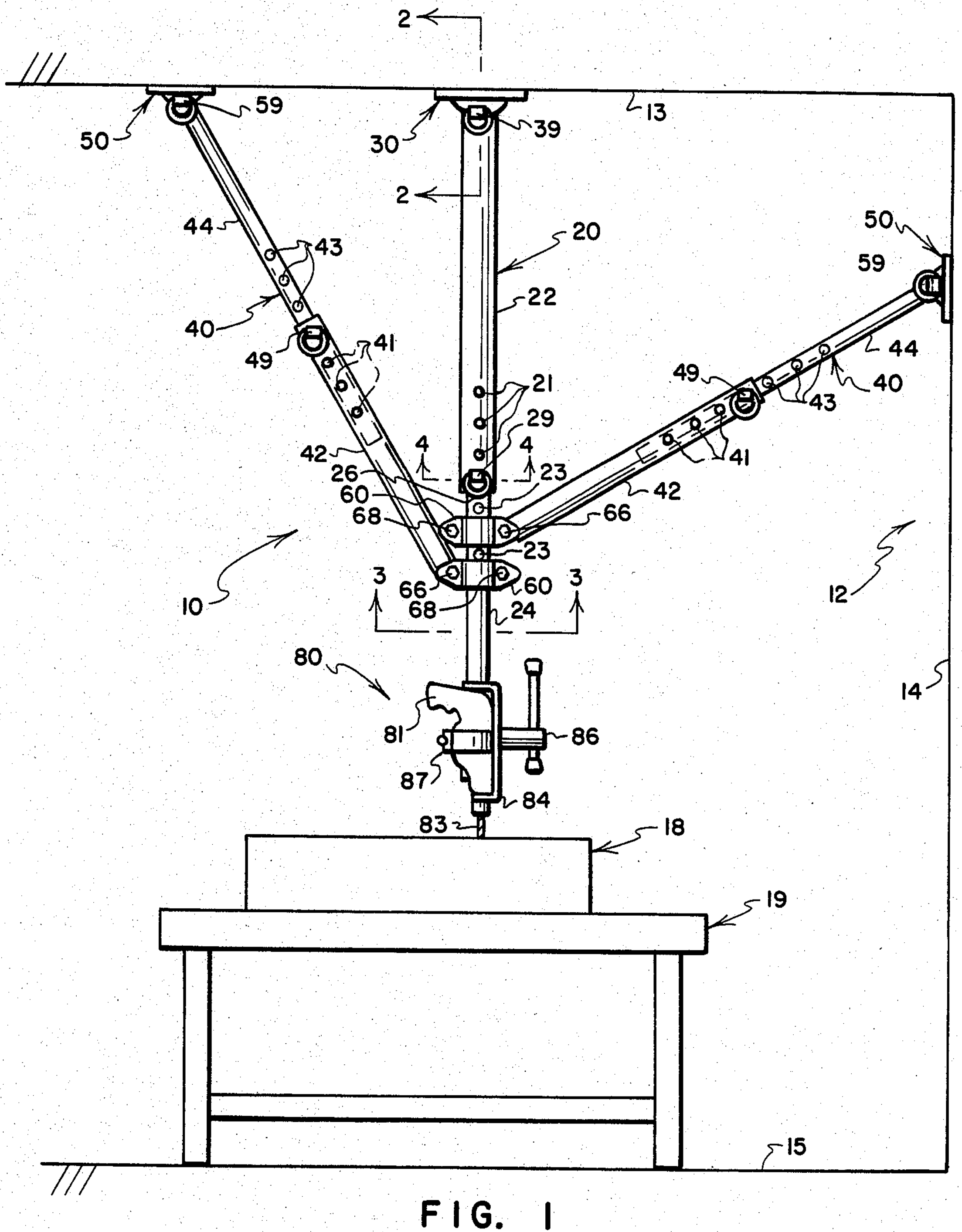
FIG. 1 is a side elevational view of a drill press embodying the preferred practice of the present invention, the press being shown connected to an existing structure, and overlying a workpiece supported on a workbench.

Referring to FIG. 1, a drill press embodying the preferred practice of the present invention is indicated generally by the numeral 10. The drill press 10 is shown connected to spaced portions of an existing structure, indicated generally by the numeral 12. The structure 12 is depicted as including a ceiling 13, an adjacent wall 14, and a floor 15. A workpiece 18 is positioned atop a workbench 19 at a location beneath the drill press 10.

The drill press 10 includes an upright member 20, brace members 40, mounting brackets 30, 50, and a power-operated drilling unit which is indicated generally by the numeral 80. The upright 20 is preferably extensible to enable the drilling unit 80 to be positioned at selected heights above the floor 15 of the existing structure 12. The brace members 40 are also preferably extensible so that they can be connected to portions of the existing structure 12 located at various distances from the upright member 20. The brace member brackets 50, and the upright member bracket 30 preferably provide pivotal mounts to enhance the versatility of the press 10, as will be explained.

Referring to FIG. 1, the upright member 20 includes an elongate outer member 22, and an elongate inner member 24. The outer and inner members 22, 24, are coaxially superposed and telescope to enable the upright 20 to extend to desired lengths. A series of spaced holes 21 are formed through the outer member 22 near the lower end of the outer member 22. A series of spaced holes 23 are formed through the inner member 24 near its upper end. By aligning selected ones of the holes 21, 23, the depending length of the upright 20 can be incrementally varied. Once the desired length of the upright 20 has been attained, a locking pin 29 is inserted through the aligned holes 21, 23 to securely couple the inner and outer members 24, 22.

Referring to FIG. 4, the locking pin 29 is shown locking the inner and outer members 24, 22 in place. The locking pin 29 is prevented from being accidentally removed or dislodged by securing it with a cotter pin 25. Removal of the cotter pin 25 enables the locking pin 29 to be withdrawn from a locking position by pulling the ring 26 attached to the locking pin 29. Once the pin 29 is removed the length of the upright 20 can be varied.

Referring to FIG. 2, a hole 27 is formed through the upper end region of the outer member 22 to facilitate connection of the upright member 20 to the mounting bracket 30. A locking pin 39 releasably connects the upright 20 to the mounting bracket 30. The bracket 30 is fastened to the ceiling 13 by suitable conventional fasteners (not shown). The mounting bracket 30 has a base 32 and a pair of spaced flanges 34 which are welded to and depend from the base 32. The flanges 34 have aligned holes 33 formed therethrough. The locking pin 39 extends through the aligned holes 33 and 27 to pivotally and releasably connect the upright 20 to the bracket 30. The locking pin 39 is identical to the locking pin 29.

The brace members 40 provide lateral support for the upright 20. Each of the brace members 40 include an outer elongate member 42 and an inner elongate member 44. The members 42, 44 of each brace 40 are coaxially superposed to enable the length of the brace members 40 to be adjusted. A series of spaced holes 41 are found in upper end portions of the outer members 42 which surround their associated inner members 44. A series of spaced holes 43 are provided in the inner member 44 near its lower end. One of the holes 41 is aligned with a selected one of the holes 43, and a locking pin 49 is inserted through these aligned holes to fix the relative positions of the inner and outer members 44, 42. The locking pin 49 is identical to the locking pin 29.

The brace members 40 are connected to existing structure 12 by mounting brackets 50. The mounting brackets 50 are substantially identical to mounting bracket 30. The brace members 40 are pivotally connected to the brackets 50 by locking pins 59 which are identical to the locking pin 29. The pivotal connections provided between the brackets 50 and the brace members 40 enable the brackets 50 to be connected to a wide variety of existing structure portions having various orientations relative to the upright member 20.

While the use of identical locking pins 29, 39, 49, 59 extending through aligned holes has been shown in the drawings as a preferred means of connecting and locking various components of the press 10, it will be understood that numerous other known connecting and locking systems may be substituted.

The removable character of the locking pins 39, 59 enables the drill press 10 to be quickly and conveniently stored. Removal of the pins 59 from the brackets 50 permits the brace members 40 to be withdrawn from the brackets 50 and moved into a position substantially parallel to the upright member 20. The upright member 20 and brace members 40 may then be moved into a storage position lying alongside the ceiling 13 where the drill press 10 can be secured by conventional fasteners (not shown).

The brace members 40 are attached to the upright member 20 by collars 60. Referring to FIG. 3, each of the collars 60 includes two substantially identical halves 62 and 64 which clampingly engage the upright member 20. The collar halves 62, 64 are held together by bolts 66 and 68 which serve to clamp the collar halves 62, 64 into tight engagement with the upright 20. The outer member 42 of the brace member 40 is shown pivotally connected to the collar 60 by the bolt 66. By loosening the bolt 66, the brace member 40 is allowed to pivot, whereby the angle at which the brace member 40 connects with the upright 20 can be adjusted. By loosening bolts 66 and 68, the collars 60 can be repositioned along the upright 20. The pivotal connections of the brace members 40 to the collars 60 enable the brace members 40 to assume various desired attitudes with respect to the upright member 20 and with respect to each other.

Referring to FIG. 5, portions of the drill press 10 are shown connected in an alternative arrangement to an existing structure 12′. The upright member 20 is shown depending from a ceiling 13′. One of the brace members 40 is shown interposed between an adjacent wall 14′ and the upright member 20 at an acute angle relative to the upright member 20. The other brace member 40 is shown connected to a post 16′ which depends from the ceiling 13′. Alternatively, both of the brace members 40 may be attached to the ceiling 13′, or one of the brace members 40 may be attached to a wall 15′, while the other of the brace members 40 is attached to the post 16′. Various other mounting arrangements of the versatile press 10 will also be apparent to those skilled in the art.

While a pair of identical brace members 40 have been described as serving to rigidify the upright member 20, it will be understood that a lesser or greater number of the brace members 40 may be utilized to provide lateral support for the upright member 20.

The power-operated drilling unit 80 is connected to the upright member 20 near its lower end by conventional clamping devices 88, as is illustrated in FIG. 6. The drilling unit 80 includes a slide carriage 84 which supports a portable electric drill 81, and a mechanism 86 for positioning the drill 81 relative to the upright 20. The positioning mechanism 86 is commercially available in a number of forms and need not be described in detail. The positioning mechanism 86 serves to controllably raise and lower the slide carriage 84 and drill 81 relative to the work area. The portable electric drill 81 is releasably secured to the slide carriage 84 by a strap 87, as is shown in FIG. 1, so that the drill 81 may be removed and used to perform other operations.

Referring to FIG. 6, a work table attachment 90 may be installed on the lower portion of the upright member 20 when desired to enable the drilling unit 80 to be used in the manner of a conventional drill press. To attach the work table 90 to the upright member 20, the drilling unit 80 is first raised to a higher location on the upright member 20 to provide mounting room on the lower portion of the upright member 20 for attachment of the work table 90. The work table 90 is releasably secured to the upright member 20 by a threaded clamping device, indicated generally by the numeral 92.

Figure 7:
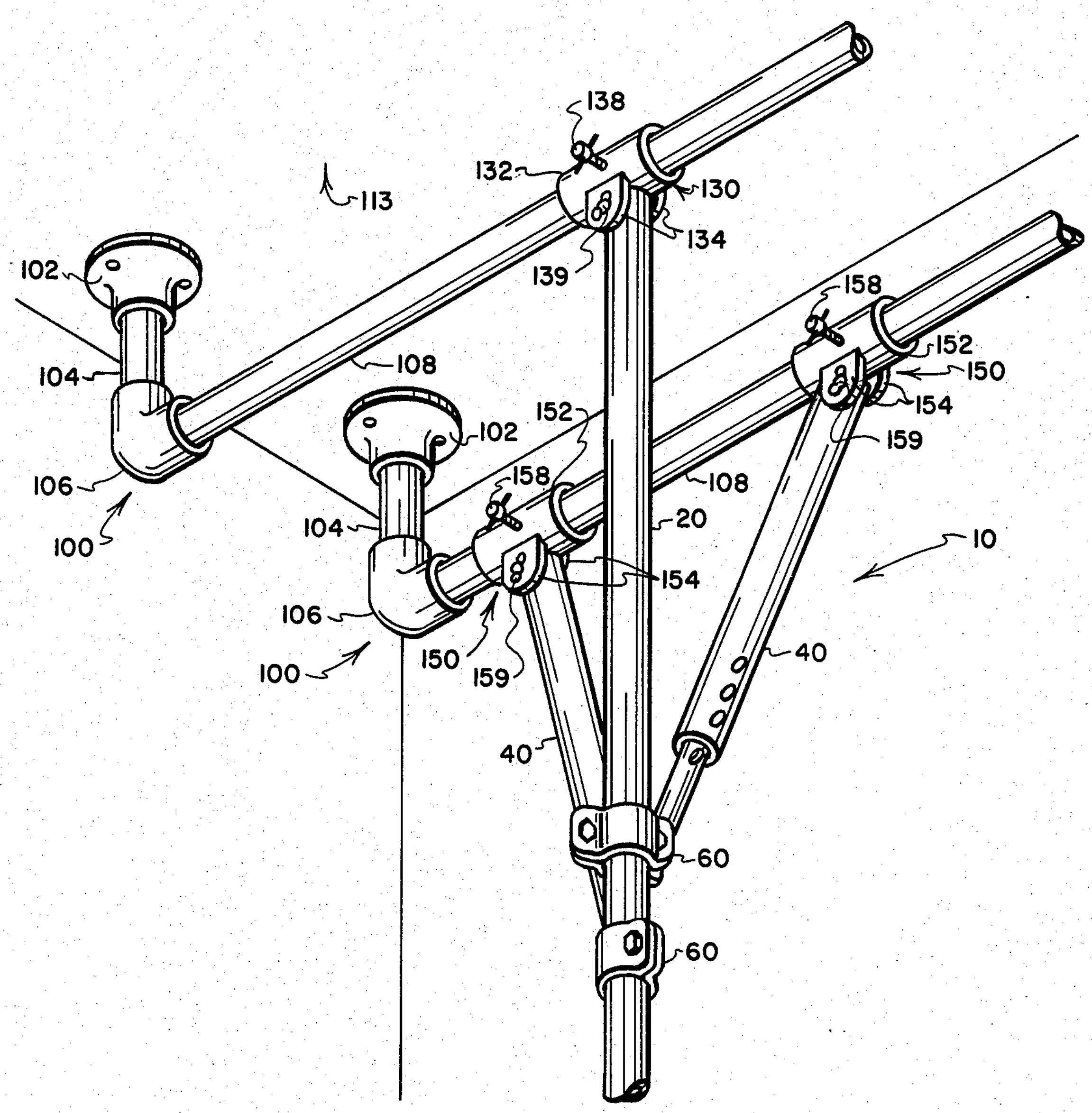
FIG. 7 is a perspective view of a portion of the overhead mount shown in an alternate mounting configuration.

Referring to FIG. 7, the drill press 10 is shown in an alternate mounting configuration connected to a pair of spaced parallel rails 100 which extend along a portion of a ceiling 113. Where this mounting configuration is utilized, support collars 130, 150 are provided to slidably connect the upright member 20 and the brace members 40 to the rails 100. This mounting configuration enables the drill press 10 to be moved laterally along a selected portion of the ceiling 113 as defined by the rails 100.

Each of the rails 100 includes a pair of mounting fixtures 102, a pair of leg members 104, a pair of elbow connectors 106, and a guide member 108. For simplicity, FIG. 7 shows only one end of each of the rails 100, and thus depicts only one mounting fixture 102, one leg member 104, and one elbow connector 106 for each of the rails 100. The mounting fixtures 102 are fastened to the ceiling by conventional fasteners (not shown). The pair of mounting fixtures 102 are secured to the ceiling 113 at spaced locations, the space therebetween defining the path of the rails 100. The leg members 104 depend from the fixtures 102 and support the guide members 108 at spaced distances from the ceiling 113. The elbow connectors 106 connect the guide members 108 and the leg members 104.

The upright member 20 of the drill press 10 is connected to a selected one of the rails 100 by the support collar 130. The collar 130 encircles the guide member 108 of a selected rail 100 and is slidable along the encircled guide member 108 to enable the upright member 20 to be moved laterally. The collar 130 is provided with an encircling portion 132 and a pair of spaced flanges 134 which are welded to and depend from the encircling portion 132. The flanges 134 have aligned holes (not shown) formed therethrough, as described previously in conjunction with the flanges 34 of the mounting bracket 30. The upright member 20 is connected to the collar 130 in substantially the same manner as was previously described for connecting the upright member 20 to the mounting bracket 30.

A locking pin 139, which is identical to pin 39, extends through aligned holes (not shown) in the flanges 134 and in the upright member hole 27 to releasably pivotally connect the upright member 20 to the collar 130. The collar 130 additionally provides a threaded locking device 138. The locking device 138 extends through the encircling portion 132 and serves to fix the position of the collar 130 relative to the guide member 108. When the locking device 138 is tightened the collar 130 and upright member 20 are rigidly secured so that drilling operations can be performed.

The brace members 40 are connected to one of the guide members 108 by support collars 150. The collars 150 are identical to collar 130. Each of the collars 150 has an encircling portion 152 and a pair of spaced flanges 154 which are welded to and depend from the encircling portion 152. The flanges 154 have aligned holes (not shown) formed therethrough. The brace members 40 are connected to the collars 150 by locking pins 159 in substantially the same manner as described previously described for connecting the brace members 40 to the brackets 50. A locking device 158 is provided through a portion of the encircling collar 152. The locking device 158 is threaded and may be tightened to secure the collar 150 at a selected location along the guide section 108.

By loosening locking devices 138, 158 the drill press 10 can be moved along the rails 100 so that it may be positioned as desired for drilling operations, or placed out of the way for storage.

While the drill press 10 has been described as being supported by a pair of rails 100, a greater or lesser number of rails 100 may be employed with or without provisions for securing additional braces (not shown) directly to walls or ceilings. While such words as "upright," "upward," "downward" and the like are employed herein, it will be understood that drillpresses embodying features of the present invention may be oriented in substantially any attitude; hence, these words are intended simply to facilitate an understanding of relative orientations among components, and should not be interpreted as being limiting.

As will be apparent from the foregoing description, the present invention provides a versatile and economical drill press having an overhead mount which enables an operator to accurately drill holes at substantially all desired locations in large workpieces.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentability exist in the invention disclosed.

What is claimed is:

1. A drill press mounting assembly comprising:

an upright member having connection means at one end thereof for detachably securing an electric drill thereto for use at a work station, overhead mount means including a pivotal connection attached to the other end of said upright member for supporting said upright member in swingable pendant relation therefrom, a pair of bracing members disposed respectively in angular relation to said upright member, said bracing members each having respective pivotal connections at each end thereof, said upright member and each of said bracing members respectively including telescopically extensible portions disposed between said connections thereof thereby to adjustably select a predetermined fixed length for said upright member and each of said bracing members, each said bracing member having its pivotal connection at one said end adjustably securable at selected positions to said upright member, and, overhead mount means attached respectively to the said pivotal connection at the other said end of each said bracing member, thereby to facilitate positioning of said mounting assembly as necessary by virtue of the said pivotal connections at each end of each said bracing member, whereby an electric drill secured to said pendant upright member is stabilized for drilling operations by said pair of angularly related bracing members through the respective overhead mounts thereof and of said pendant upright member.

2. The drill press of claim 1 wherein the power operated drilling means includes:

(a) a portable electric drill;

(b) a slide carriage means for holding the portable electric drill relative to the workpiece;

(c) connecting means for attaching the slide carriage means to the upright member; and, (d) positioning means for controllably positioning the slide carriage relative to the upright member.

3. The drill press of claim 1 wherein the overhead mount means includes means for allowing the upright member to be oriented in an attitude extending alongside selected portions of an overhead structure for storage of the drill press.

4. The drill press of claim 1 wherein the overhead mount means includes quick release disengageable parts for releasably securing the upright member to an overhead structure.

5. The drill press of claim 1 wherein the overhead mount means includes means for slidably mounting the upright member to an existing overhead structure, thereby allowing the upright member to be moved laterally along a selected portion of the overhead structure.

6. The drill press of claim 5 wherein the means for slidably mounting the upright member to the existing overhead structure includes:

(a) at least one rail connected to a selected portion of the existing overhead structure;

(b) means for slidably connecting the upright member to the rail; and, (c) means for releasably securing the upright member to selected locations along the length of the rail.

7. The drill press of claim 6 wherein the means for slidably connecting the upright member to the rail includes a collar journaling the rail and carrying locking means for fixing the relative positions of the collar and the rail.

8. The drill press of claim 6 wherein the means for slidably connecting the upright member to the rail includes disengageable parts for releasably securing the upright member to the rail.

* * * * *